US009681297B2

(12) United States Patent
Lu et al.

(10) Patent No.: US 9,681,297 B2
(45) Date of Patent: Jun. 13, 2017

(54) INFORMATION EXCHANGE METHOD AND APPARATUS

(71) Applicant: ALIBABA GROUP HOLDING LIMITED, George Town, Grand Cayman (KY)

(72) Inventors: Kun Lu, Hangzhou (CN); Cheng Chen, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 4 days.

(21) Appl. No.: 14/828,274

(22) Filed: Aug. 17, 2015

(65) Prior Publication Data

US 2016/0050318 A1   Feb. 18, 2016

(30) Foreign Application Priority Data

Aug. 18, 2014   (CN) .......................... 2014 1 0406791

(51) Int. Cl.
  H04M 3/493    (2006.01)
  H04W 12/06    (2009.01)
  H04W 4/16     (2009.01)
  H04L 29/08    (2006.01)
  H04L 29/06    (2006.01)
  G10L 15/22    (2006.01)
  G10L 15/28    (2013.01)

(52) U.S. Cl.
  CPC ............. *H04W 12/06* (2013.01); *G10L 15/22* (2013.01); *H04L 67/2823* (2013.01); *H04W 4/16* (2013.01); *G10L 15/28* (2013.01); *G10L 2015/225* (2013.01); *H04L 63/0861* (2013.01); *H04L 63/168* (2013.01)

(58) Field of Classification Search
  CPC ... G10L 19/00; H04L 63/0861; H04L 63/168; H04L 67/2823; H04M 3/4936; H04W 12/06; H04W 4/16
  See application file for complete search history.

(56) References Cited

U.S. PATENT DOCUMENTS 6,202,054 B1   3/2001   Lawlor et al.
6,308,158 B1   10/2001  Kuhnen et al.
6,760,601 B1   7/2004   Suoknuuti et al.
(Continued)

FOREIGN PATENT DOCUMENTS

CN    103490826       1/2014
EP    2432205 A1      3/2012
WO    WO 98/10607 A1  3/1998

OTHER PUBLICATIONS

Karl Czajkowski et al., "Grid Information Services for Distributed Resource Sharing," 10th IEEE International Symposium on High Performance Distributed Computing, Aug. 2001 (14 pages).
(Continued)

*Primary Examiner* — Kashif Siddiqui
(74) *Attorney, Agent, or Firm* — Finnegan, Henderson, Farabow, Garrett & Dunner LLP

(57) ABSTRACT

An information exchange method is provided. The method includes receiving interacting information input by a user, encoding the interacting information to obtain voice signals, sending the voice signals to a server, and receiving feedback information sent by the server indicating a processing result associated with the interacting information.

20 Claims, 7 Drawing Sheets

(56) References Cited

U.S. PATENT DOCUMENTS

| | | | |
|---|---|---|---|
| 6,909,708 B1* | 6/2005 | Krishnaswamy | H04L 65/103 |
| | | | 370/352 |
| 7,269,188 B2 | 9/2007 | Smith | |
| 8,041,337 B2 | 10/2011 | Kobayashi et al. | |
| 8,391,187 B2 | 3/2013 | Jager et al. | |
| 9,148,823 B2 | 9/2015 | Forssell | |
| 2002/0034168 A1 | 3/2002 | Swartz et al. | |
| 2004/0248514 A1 | 12/2004 | Idani et al. | |
| 2005/0216593 A1 | 9/2005 | Kotar | |
| 2006/0199533 A1 | 9/2006 | Zilliacus et al. | |
| 2007/0230371 A1* | 10/2007 | Tumminaro | H04M 11/066 |
| | | | 370/259 |
| 2009/0055322 A1 | 2/2009 | Bykov et al. | |
| 2009/0093236 A1* | 4/2009 | Balan | H04W 4/02 |
| | | | 455/411 |
| 2010/0179813 A1 | 7/2010 | Summerfield et al. | |
| 2012/0275450 A1 | 11/2012 | Connelly et al. | |
| 2014/0335822 A1* | 11/2014 | Jain | H04M 15/08 |
| | | | 455/407 |

OTHER PUBLICATIONS

Yunnan Wu et al., "Information Exchange in Wireless Networks with Network Coding and Physical-layer Broadcast," Technical Report, Microsoft Research, Microsoft Corporation, Redmond, WA, Aug. 2004 (7 pages).

PCT International Search Report and the Written Opinion dated Dec. 14, 2015, issued in corresponding International Application No. PCT/US15/45563 (15 pages).

* cited by examiner

INFORMATION EXCHANGE METHOD AND APPARATUS

CROSS-REFERENCE TO RELATED APPLICATION

This application is based upon and claims priority to Chinese Patent Application No. 201410406791.8, filed on Aug. 18, 2014, the entire content of which is incorporated herein by reference.

TECHNICAL FIELD

The present application relates to network technologies and, more particularly, to an information exchange method and an information exchange apparatus.

BACKGROUND

Along with the development of smart terminal devices, users frequently use terminal devices for information transmission in daily life. For example, a user may install an application in a smart phone for transmitting application-related information to a server, and the server may perform corresponding processing according to the received information. Use of a smart terminal device (e.g., a smart phone) for information transmission allows information exchange to be realized at ease. Generally, the terminal device transmits information through a data network, such as a 3G/4G cellular network. In an environment where a data network is unavailable, however, information transmission by the terminal device may be suspended, thereby negatively affecting user experience.

SUMMARY

The present disclosure provides an information exchange method. Consistent with some embodiments, the method includes receiving interacting information input by a user, encoding the interacting information to obtain voice signals, sending the voice signals to a server, and receiving feedback information sent by the server indicating a processing result associated with the interacting information.

Consistent with some embodiments, this disclosure provides another information exchange method. The method includes receiving voice signals transmitted from a terminal device, decoding the voice signals to obtain interacting information, performing information processing based on the interacting information, and sending feedback information to the terminal device when the information processing is completed.

Consistent with some embodiments, this disclosure provides an information exchange apparatus. The information exchange apparatus includes an encoding and decoding unit and a voice call unit. The encoding and decoding unit may be configured to receive interacting information input by a user, and encode the interacting information to obtain voice signals. The voice call unit may be configured to send the voice signals to a server, and receive feedback information sent by the server indicating a processing result associated with the interacting information.

Consistent with some embodiments, this disclosure provides a server. The server includes a voice call unit configured to receive voice signals transmitted from a terminal device, an encoding and decoding unit configured to decode the voice signals to obtain interacting information, and a processing unit configured to perform information processing based on the interacting information. The voice call unit may be further configured to send the feedback information to the terminal device when the information processing is completed.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
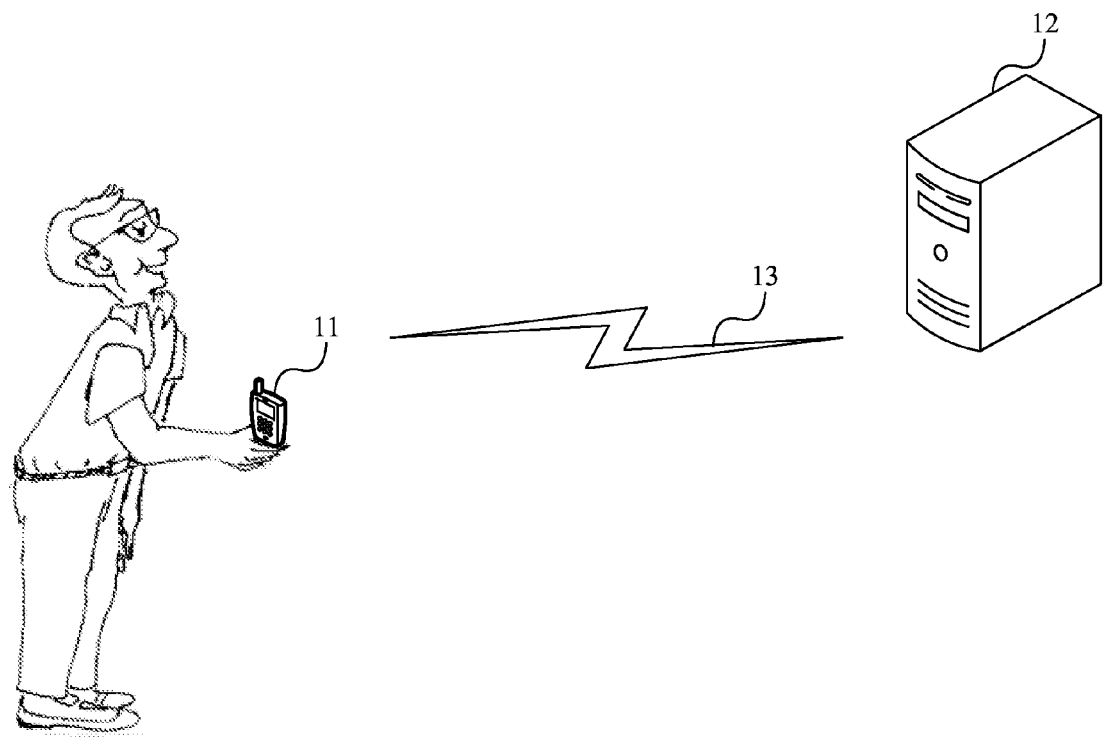
FIG. 1 illustrates an exemplary system environment for implementing methods and apparatuses consistent with the present disclosure.

FIG. 1 illustrates an exemplary system environment 100 for implementing methods and apparatuses consistent with the present disclosure. As shown in FIG. 1, a user may use a terminal device, such as a smart phone 11, to transmit information to a server 12 via a network 13.

For example, the user may use the terminal device, such as the smart phone 11, to log onto Weibo to post Weibo information, or use an instant messaging application on the smart phone to chat with others. The Weibo information or instant messages may be transmitted, via the network 13, to the corresponding server 12, such as a Weibo server or an instant messaging server. The server 12 may be configured to perform certain information processing based on the received information. For example, the instant messaging server may forward the messages to another terminal device that an instant messaging client uses to chat with the user, and the Weibo server may publish the Weibo information on the Internet. The instant messaging and Weibo information are examples of application scenarios of information exchange between a terminal device and a server. Other application scenarios are also possible, and the present disclosure does not intend to limit the scope of application scenarios.

The network 13 may be a data network, such as WiFi network, a 3G/4G network, etc, over which the information (e.g., instant messages or Weibo information) is transmitted. In some areas, however, the data networks are unavailable or provide relatively weak signals, causing users unable to connect to the Internet for information exchange.

Consistent with some embodiments of this disclosure, a method to use a voice network, e.g., a 2G network, to facilitate information transmission by the terminal device is provided. As the coverage and stability of a voice network, e.g., a 2G network, are typically higher than that of a data network, e.g., a 3G/4G network, the disclosed embodiments allow information to be transmitted in an area where there is no coverage of a data network or signal strength of the data network is low.

In some embodiments, a terminal device, such as a smart phone, may perform the process of information exchange using an application installed on the device. For example, a user may use an instant messaging application installed on a terminal device for chatting and exchanging information with others. As another example, a user may use a payment application installed on a terminal device to make payments when shopping. In this disclosure, the application program installed on a terminal device may be referred to as an information exchange apparatus, which allows a user to exchange certain information with a corresponding server. Further, information to be transmitted from the information exchange apparatus to a server may be referred to as interacting information. For example, the interacting information may include service information a user provides to perform certain transactions with a corresponding server, instant messages to be sent to another user via the server, files to be published by the server and shared among the users, or any other types of data to be transmitted to the server and/or other users.

Figure 2:
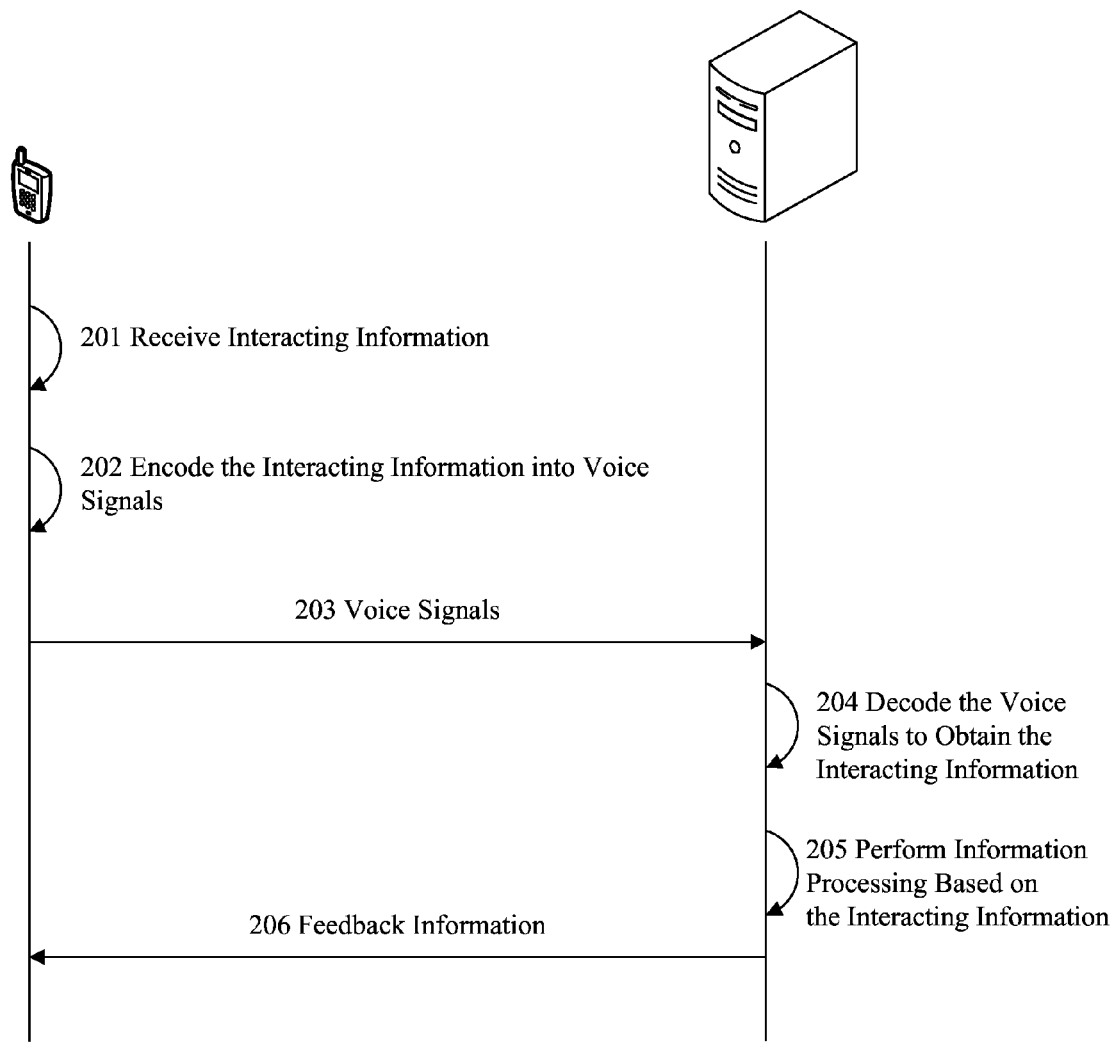
FIG. 2 is a flow diagram of an exemplary method for exchanging information, consistent with some embodiments of this disclosure.

FIG. 2 is a flow diagram of an exemplary method 200 for exchanging information between an information exchange apparatus and a server, consistent with some embodiments of this disclosure. Referring to FIG. 2, the exemplary method 200 includes the following steps.

In step 201, the information exchange apparatus receives interacting information that is to be transmitted to the server. For example, the information exchange apparatus may be a payment application or an instant messaging application installed on a terminal device, such as a smart phone, and the interacting information may be information that the user inputs when using the application, such as the payee information, the account of another user which the user desires to chat with, etc.

The information exchange apparatus may receive the interacting information through a user interface. For example, when the information exchange apparatus runs on a terminal device, the information exchange apparatus may provide an interface for a user to input information, such as information input fields that the user may input information into, information options that are selectable by the user, or the like.

In step 202, the information exchange apparatus encodes the interacting information into voice signals. The interacting information received by the information exchange apparatus is typically in a form of digital information. For example, when the user inputs "Feng Yun 5629" on a terminal device, such as a smart phone, the terminal device may convert the user input into corresponding binary digital information in a format similar to "010101 . . . " and store the corresponding digital information.

In this embodiment, the information exchange apparatus may perform Digital to Analog conversion on the interacting information and encode it into voice analog signals. The Digital to Analog conversion process may be carried out in a conventional way known to an ordinary skilled in the art, which will not be described in detail herein.

Figure 3:
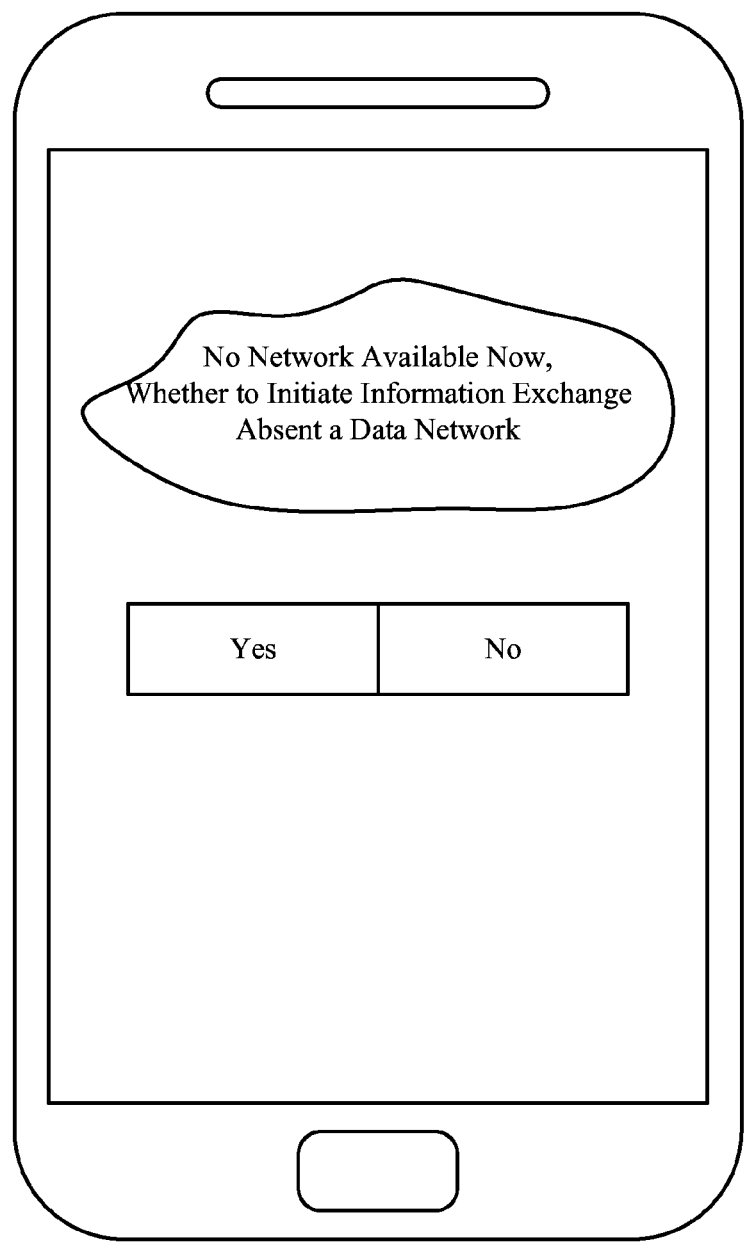
FIG. 3 is a schematic diagram illustrating an application interface, consistent with some embodiments of this disclosure.

In some implementations, the information exchange apparatus may determine whether to perform Digital to Analog conversion according to the user input. FIG. 3 is a schematic diagram illustrating an application interface 300, consistent with some embodiments of this disclosure. As shown in FIG. 3, a terminal device may display prompt information indicating that no data network is currently available, and a user may select through the application interface whether to initiate information exchange absent a data network. If the user selects "No", the information exchange apparatus may terminate this information exchange flow. If the user selects "Yes", the information exchange apparatus may consider the user selection as a request to send interacting information to the server. Correspondingly, the information exchange apparatus may receive the interacting information input by the user and convert it into voice signals for sending to the server. In some embodiments, the information exchange apparatus may detect whether a data network is available and display the prompt information prior to performing step 201.

In step 203, the information exchange apparatus sends the voice signals to a server. For example, the information exchange apparatus may send the encoded voice signals to a server via a voice channel. The voice channel may be established by the information exchange apparatus with the server in advance, for example, when the user selects to initiate information exchange absent a data network. Alternatively, the information exchange apparatus may establish the voice channel after converting the interacting information into voice signals. In some embodiments, the information exchange apparatus may store a dial-in number for voice dialing of a corresponding server in advance and establish the voice channel by dialing the dial-in number.

In step 204, the server decodes the voice signals to obtain the interacting information. For example, upon receiving the voice signals transmitted via the voice channel from the information exchange apparatus, the server may perform Analog to Digital conversion on the voice signals to restore them into digital signals, and in turn obtain the interacting information.

In step 205, the server performs information processing based on the interacting information. For example, when the interacting information is related to Weibo, the Weibo server may publish the interacting information. As another example, when the interacting information is an instant message, the instant messaging server may forward the instant message to another terminal device that an instant messaging client uses to chat with the user. As another example, when the interacting information is fund transfer information, the server may transfer a corresponding amount from a transfer-out account to a transfer-in account.

In step 206, the server sends feedback information to the information exchange apparatus indicating the processing result. For example, the server may send the feedback information to the information exchange apparatus when the information processing is completed. The feedback information may be "success" or "failure", or other types of processing result. The feedback information may be transmitted to the information exchange apparatus via a voice channel. For example, the server may convert the feedback information into voice signals for transmission over the voice channel, and upon receiving the voice signals, the information exchange apparatus may convert them into the feedback information.

In the method 200, information is converted to voice signals for transmitting between an information exchange apparatus and a server over a voice channel. As the voice channel generally provides a good coverage and stability, the method 200 allows smooth information exchange in circumstances where no data network is available.

Figure 4:
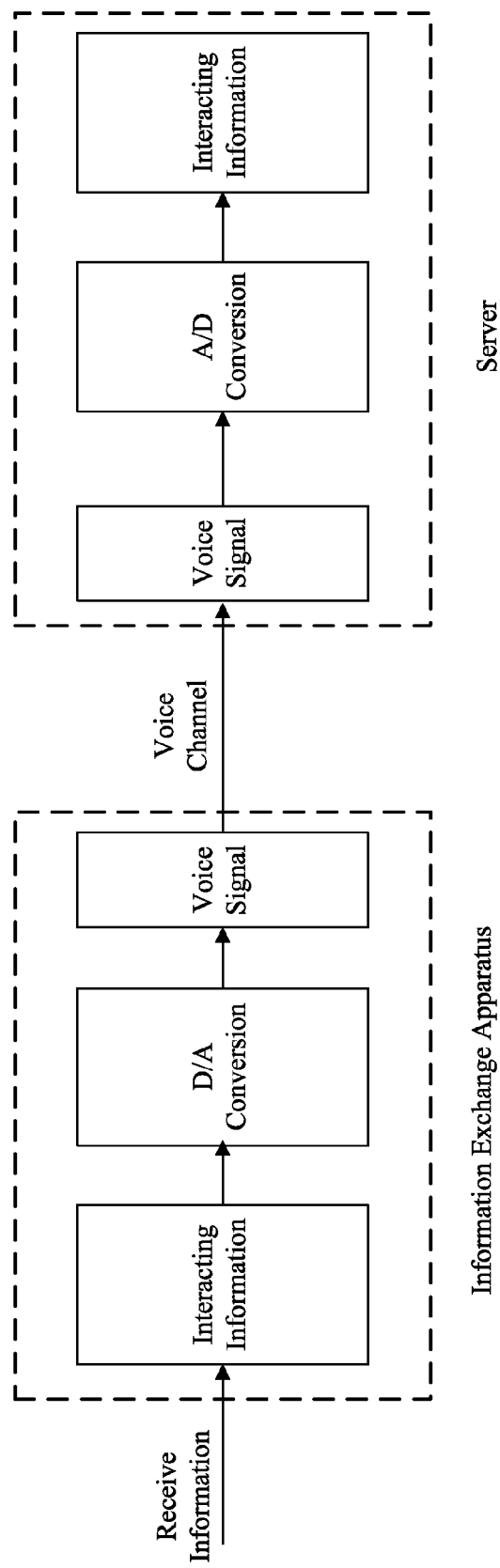
FIG. 4 is a block diagram of an exemplary method for exchanging information, consistent with some embodiments of this disclosure.

FIG. 4 is a block diagram of an exemplary method 400 for exchanging information between an information exchange apparatus and a server, consistent with some embodiments of this disclosure. In the method 400, the information exchange apparatus converts the interacting information to voice signals, transmits via a voice channel to the server, and then the server converts the voice signals to the interacting information. FIG. 4 illustrates the information conversion process when interacting information is transmitted from the information exchange apparatus to the server. The same method as shown in FIG. 4 may be used when information is transmitted from the server to the information exchange apparatus. For example, the server may convert the information to be transmitted to voice signals, transmits the voice signals via a voice channel to the information exchange apparatus, and the information exchange apparatus may then perform the Analog to Digital conversion on the voice signals to obtain the transmitted information.

Figure 5:
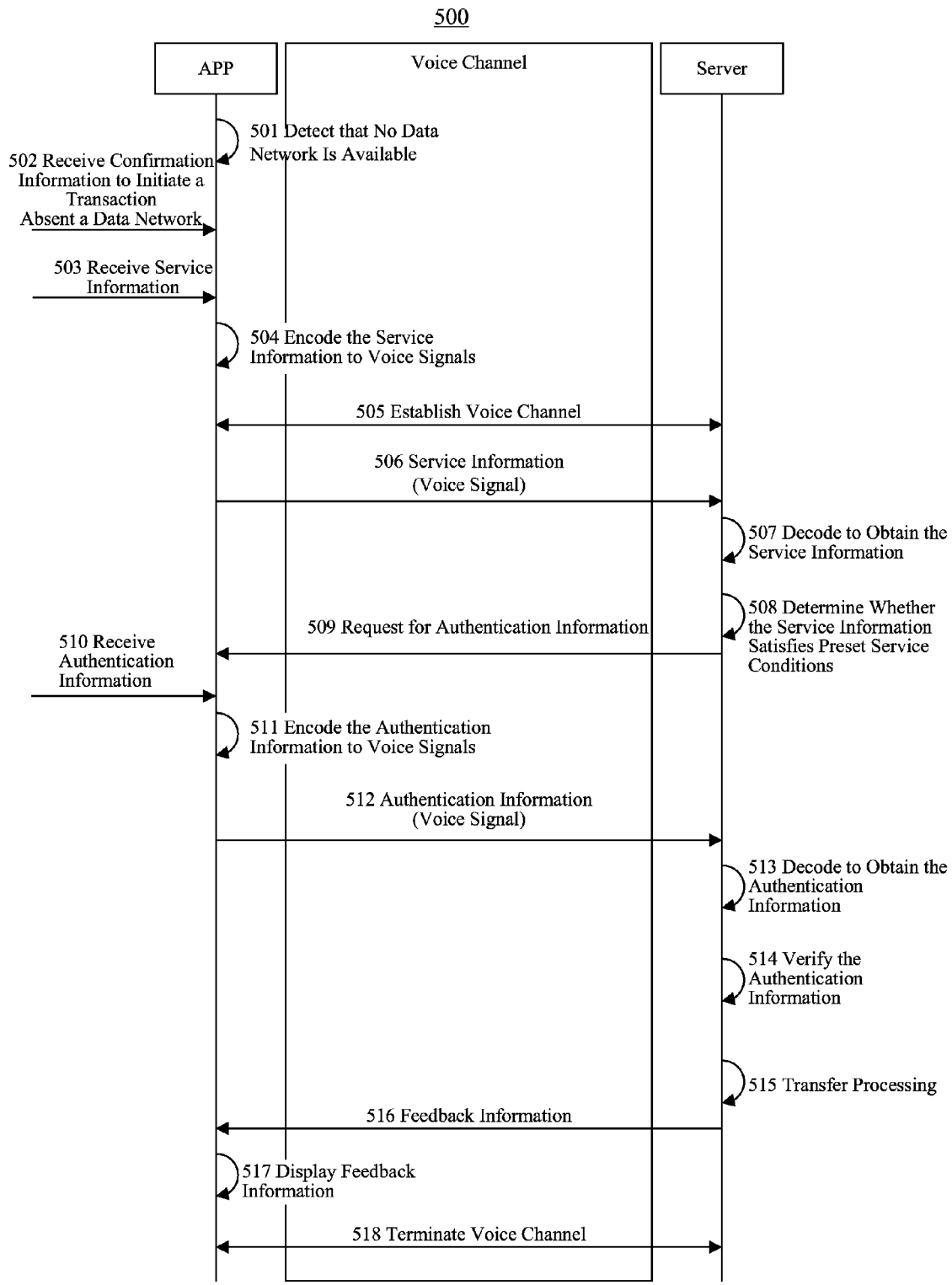
FIG. 5 is a flow diagram of another exemplary method for exchanging information, consistent with some embodiments of this disclosure.

FIG. 5 is a flow diagram of another exemplary method 500 for exchanging information, consistent with some embodiments of this disclosure. In this application scenario, the user uses an application ("APP") on a terminal device (e.g., a smart phone), such as an Alipay wallet application, to perform a fund transfer transaction. Correspondingly, in this example, the information exchange apparatus described above is the APP, and the interacting information includes service information for a fund transfer transaction. The interacting information may be input by the user via the terminal device (e.g., a smart phone) and transmitted to a server. The server performs authentication on the interacting information, and when the authentication is successful, the server performs the transfer operation. As shown in FIG. 5, communication between the APP and the server is established via a voice channel.

In step 501, the APP detects that there is no data network available currently. For example, the APP may call the network detection module of the terminal device via an interface to detect the current network conditions, such as whether there is network signal, strength of the network signal, etc. At this step, the APP may determine that there is no data network available at this moment, for example, the network signal strength may be below an acceptable level.

In step 502, the APP receives confirmation information from the user to initiate a transaction absent a data network. For example, the APP may display two options to the user and prompt the user to "agree" or "reject" exchange of information absent a data network. If the user does not agree to exchange information absent a data network, the information exchange flow between the APP and the server may be terminated. In some implementations, the APP may again prompt the user that currently there is no data network available. If the user agrees to exchange information absent a data network, the APP may proceed to execute step 503.

In step 503, the APP receives the service information input by the user. For example, the service information may include the source account of the transfer (i.e. the transfer-out account), the target account of the transfer (i.e. the transfer-in account), the transfer amount, etc.

In step 504, the APP encodes the service information from digital signals to voice signals. For example, the APP may convert the service information input by the user in step 503 from digital signals to voice analog signals.

In step 505, the APP establishes a voice channel with the server for transmitting voice signals. In some embodiments, the voice channel may be established via dialing a pre-stored dial-in number. For example, the APP may automatically dial a number corresponding to the server that is pre-stored in the APP. By dialing the number, the APP may establish a voice channel for transmitting voice signals with the server.

In some implementations, the voice channel may be established in other steps prior to step 505. For example, the APP may begin to establish the voice channel in step 502 when the APP receives confirmation information from the user for exchanging information absent a data network.

In step 506, the APP sends the voice signals of the service information to the server over the voice channel.

In step 507, the server decodes the voice signals to obtain the service information. For example, the server may decode the voice signals to obtain the service information, including transfer account, transfer amount, etc.

In step 508, the server determines whether the service information satisfies preset service conditions. For example, when the server may determine whether the transfer-out account has sufficient balance for being transferred out, or whether the transfer amount is within a preset amount range, etc. If the service information does not satisfy the service conditions, e.g., the transfer amount exceeds the upper limit of the transfer-out amount corresponding to the user, the server may determine that the service condition is not satisfied and proceed to step 516 to send feedback information, e.g., a notice of information processing failure, to the APP. If it is determined that the service condition is satisfied, the server may proceed to step 509.

In step 509, the server sends a request for authentication information to the APP. In this step, the server instructs the APP to obtain authentication information of the user. The authentication information may include, for example, user name, password and the like.

In step 510, the APP receives authentication information input by the user, such as user name, password or the like.

In step 511, the APP encodes the authentication information from digital signals to voice signals.

In step 512, the APP transmits the voice signals of the authentication information to the server over the voice channel.

In step 513, the server decodes the voice signals to obtain the authentication information.

In step 514, the server verifies the authentication information. For example, the server may compare the authentication information with pre-stored user information and determine whether the authentication information is information is consistent with the pre-stored information. The pre-stored user information, such as user name, password and the like, may be input by the user and stored at the server during registration of the user.

If the authentication information fails verification, the server may proceed to step 516 to send feedback information, e.g., a notice of information processing failure, to the APP. If the authentication information passes verification, the server may proceed to step 515.

In step 515, the server performs transfer processing based on the service information. For example, the server may transfer an amount of fund corresponding to the transfer amount from the transfer-out account to the transfer-in account according to the received service information.

In step 516, the server sends feedback information, such as processing result associated with the transaction, to the APP. For example, when the transfer processing is completed, the server may send an indication of whether or not the information processing is successful to the APP. In some implementations, the server may encode the feedback information to convert it from digital signals to voice signals, and send the voice signals to the information exchange apparatus via a voice channel.

The feedback information may indicate to the information exchange apparatus whether the process of information exchange is successful. In some implementations, the server may use some predetermined format to represent these results, for example, "1" is used to indicate successful exchange, and "0" is used to indicate unsuccessful exchange.

In step 517, the APP displays the feedback information to the user. For example, the APP may display the feedback information to the user via a message on the screen.

In step 518, the APP terminates the voice channel.

In some embodiments, the server may proactively initiate the establishment of a voice channel with the APP. For example, the server may dial a user number (e.g. the cell phone number of the user) and proactively initiate the establishment of a voice channel with the APP. Further, the server may establish multiple voice channels with multiple users simultaneously. For example, there may be multiple users each using a wallet APP to initiate the establishment of a voice channel with the server, and the server may establish a voice channel with each of the users, respectively.

In the method 500, after a user selects to initiate information exchange absent a data network, the information exchange apparatus may dial the number of server to establish a voice channel with no additional user input required. From the perspective of a user, the information exchange using the voice channel may appear the same as regular information exchange in a data network. The above described processes of establishing voice channels or conversion between digital signal and voice signal may be configured as background processes transparent to the user.

Figure 6:
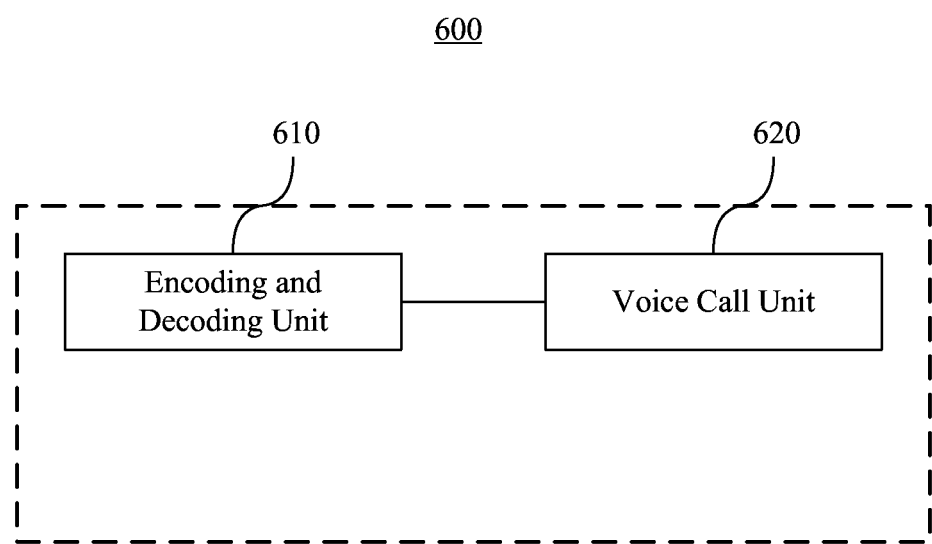
FIG. 6 is a block diagram of an exemplary information exchange apparatus, consistent with some embodiments of this disclosure.

FIG. 6 is a block diagram of an exemplary information exchange apparatus 600, consistent with some embodiments of this disclosure. For example, the information exchange apparatus 600 may be implemented to be a part or all of an application installed on a terminal device, such as a smart phone. Referring to FIG. 6, the information exchange apparatus 600 may include an encoding and decoding unit 610 and a voice call unit 620.

The encoding and decoding unit 610 is configured to receive interacting information to be transmitted and encode the interacting information into voice signals. For example, the encoding and decoding unit 610 may be configured to receive service information associated with a network service provided by a server and encode the service information into voice signals. In some embodiments, the encoding and decoding unit 610 may be further configured to receive authentication information and encode the authentication information into voice signals.

The voice call unit 620 is configured to send the voice signals to a server over a voice channel. The server may decode the voice signals to obtain the interacting information and process the interacting information. The voice call unit 620 may also be configured to receive feedback information, such as processing result information, from the server when the information processing is completed. In some embodiments, the voice call unit 620 may also be configured to perform voice dialing according to a pre-stored dial-in number for establishing a voice channel with the server.

In some embodiments, the encoding and decoding unit 610 may be further configured to receive confirmation information from a user for initiating information exchange absent a data network. For example, the confirmation information may be received before the voice call unit 62 establishes a voice channel for transmitting the voice signals.

Figure 7:
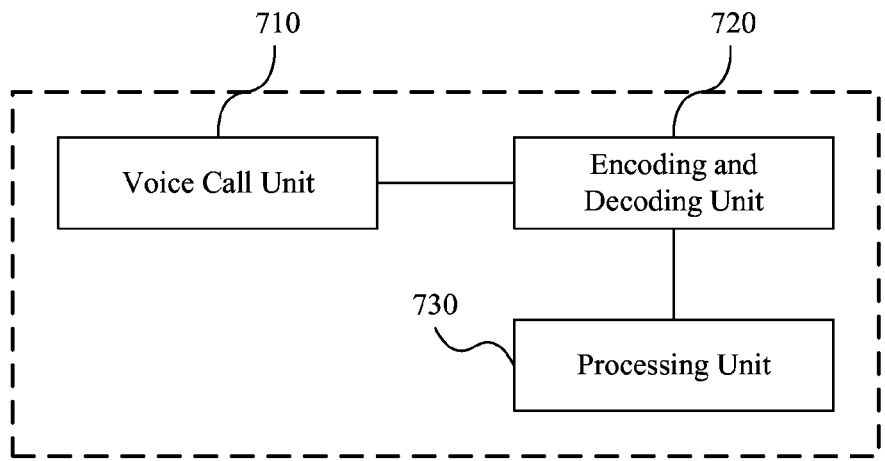
FIG. 7 is a block diagram of an exemplary information processing apparatus, consistent with some embodiments of this disclosure.

FIG. 7 is a block diagram of an exemplary information processing apparatus 700, consistent with some embodiments of this disclosure. For example, the information processing apparatus 700 may be implemented to be a part or all of a server. Referring to FIG. 7, the information processing apparatus 700 may include a voice call unit 710, an encoding and decoding unit 720, and a processing unit 730.

The voice call unit 710 is configured to receive voice signals transmitted from an information exchange apparatus.

The encoding and decoding unit 720 is configured to decode the voice signals to obtain the interacting information. For example, the encoding and decoding unit 720 may be configured to decode the voice signals to obtain service information associated with a service provided at the server.

The processing unit 730 is configured to performing information processing according to the interacting information. The processing unit 730 may be further configured to determine whether the interacting information satisfies preset service conditions when performing the information processing. In some embodiments, the processing unit 730 may be further configured to instruct the voice call unit 710 to send feedback information, such as the processing result information, to the information exchange apparatus when the information processing is completed.

In some embodiments, the encoding and decoding unit 720 may be further configured to decode the voice signals to obtain the authentication information. The processing unit 730 may be configured to perform information processing upon determining that the authentication information is correct.

In some embodiments, the voice call unit 710 may be further configured to, prior to receiving voice signals transmitted from the information exchange apparatus, establish a voice channel with the information exchange apparatus according to a dial-in number for voice dialing of the information exchange apparatus.

In some embodiments, the encoding and decoding unit 720 may be further configured to encode the feedback information, such as the processing result information, into voice signals. The voice call unit 710 may be further configured to transmit the voice signals of the feedback information to the information exchange apparatus via the voice channel.

In exemplary embodiments, a non-transitory computer-readable storage medium including instructions is also provided, and the instructions may be executed by a device (such as a terminal device, a server, a personal computer, or the like), for performing the above-described methods. The device may include one or more processors (CPUs), an input/output interface, a network interface, and/or a memory.

For example, the non-transitory computer-readable storage medium may be read-only memory (ROM), random access memory (RAM), Compact Disc Read-Only Memory (CD-ROM), magnetic tape, floppy disk, and optical data storage device, etc. Examples of RAM include Phase Change Random Access Memory (PRAM), Static Random Access Memory (SRAM), Dynamic Random Access Memory (DRAM), and other types of RAM.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. An information exchange method, comprising:
   receiving confirmation information from a user indicating a request to initiate information exchange absent a data network;
   receiving interacting information input by the user;
   encoding the interacting information to obtain voice signals;
   sending the voice signals to a server; and
   receiving feedback information sent by the server indicating a processing result associated with the interacting information.

2. The method according to claim 1, wherein the interacting information includes service information associated with a service provided by the server.

3. The method according to claim 1, further comprising:
   receiving authentication information input by the user;
   encoding the authentication information to obtain authentication voice signals; and
   sending the authentication voice signals to the server.

4. The method according to claim 1, further comprising:
   establishing a voice channel with the server for transmitting the voice signals by dialing a pre-stored dial-in number.

5. The method according to claim 4,
   wherein the confirmation information is received prior to establishing the voice channel.

6. An information exchange method, comprising:
   receiving voice signals transmitted from a terminal device, wherein the terminal device transmits the voice signals after receiving confirmation information from a user indicating a request to initiate information exchange absent a data network;
   decoding the voice signals to obtain interacting information;
   performing information processing based on the interacting information; and
   sending feedback information to the terminal device when the information processing is completed.

7. The method according to claim 6, wherein the interacting information includes service information associated with a service provided by a server, the method further comprising:
   determining whether the service information satisfies one or more preset service conditions.

8. The method according to claim 6, further comprising:
   decoding the voice signals to obtain authentication information;
   determining whether the authentication information is correct; and
   performing the information processing if it is determined that the authentication information is correct.

9. The method according to claim 6, further comprising:
   establishing a voice channel with the terminal device by dialing a dial-in number.

10. The method according to claim 9, further comprising:
    encoding the feedback information into feedback voice signals; and
    sending the feedback voice signals to the terminal device via the voice channel.

11. An information exchange apparatus, comprising:
    an encoding and decoding unit configured to:
      receive confirmation information from a user indicating a request to initiate information exchange absent a data network;
      receive interacting information input by the user; and
      encode the interacting information to obtain voice signals; and
    a voice call unit configured to:
      send the voice signals to a server; and
      receive feedback information sent by the server indicating a processing result associated with the interacting information.

12. The apparatus according to claim 11, wherein the interacting information includes service information associated with a service provided by the server.

13. The apparatus according to claim 12, wherein the encoding and decoding unit is further configured to:
   receiving authentication information; and
   encoding the authentication information to obtain authentication voice signals.

14. The apparatus according to claim 11, wherein the voice call unit is further configured to establish a voice channel with the server for transmitting the voice signals by dialing a pre-stored dial-in number.

15. The apparatus according to claim 14, wherein the confirmation information is received by the encoding and decoding unit prior to establishing the voice channel.

16. A server, comprising:
   a voice call unit configured to receive voice signals transmitted from a terminal device, wherein the terminal device transmits the voice signals after receiving confirmation information from a user indicating a request to initiate information exchange absent a data network;
   an encoding and decoding unit configured to decode the voice signals to obtain interacting information; and
   a processing unit configured to perform information processing based on the interacting information, wherein the voice call unit is further configured to send the feedback information to the terminal device when the information processing is completed.

17. The server according to claim 16, wherein the interacting information includes service information associated with a service provided by the server, and wherein the processing unit is further configured to determine whether the service information satisfies one or more preset service conditions.

18. The server according to claim 16, wherein the encoding and decoding unit is further configured to decode the voice signals to obtain authentication information, and wherein the processing unit is further configured to:
   determine whether the authentication information is correct; and
   perform the information processing if it is determined that the authentication information is correct.

19. The server according to claim 16, wherein the voice call unit is further configured to establish a voice channel with the terminal device by dialing a dial-in number.

20. The server according to claim 19, wherein the encoding and decoding unit is further configured to encode the feedback information into feedback voice signals, and wherein the voice call unit is further configured to transmit the feedback voice signals to the terminal device via the voice channel.

* * * * *